United States Patent Office 3,278,449
Patented Oct. 11, 1966

3,278,449
VISIBLE LIGHT FILTERING
Eugene R. Hardwick, Los Angeles, and Harry S. Mosher, Stanford, Calif., assignors to Sundstrand Corporation, Rockford, Ill., a corporation of Illinois
No Drawing. Filed Dec. 20, 1960, Ser. No. 76,999
4 Claims. (Cl. 252—300)

This invention relates to controlling of visible light intensity and more particularly provides an improved composition and process for modifying the intensity of bright light including flash illuminations to a level permitting comfortable viewing. The improved composition and process may be usefully applied to visual sensing devices such as photoelectric cells and to photography.

Conventionally, colored lenses have been used in spectacles, including goggles, to protect the eyes from high intensity light e.g. welders' goggles and other goggles for workers to wear to inspect materials of high light intensity. Colored spectacles now used lack the ability to adjust to prevailing light intensity. Each spectacle has a narrow range of light intensities for which it provides most comfort to the wearer. There is a decided need for eye glasses having lenses which are capable of adjusting themselves instantly to prevailing light intensities. For instance, it would be desirable to have eye glasses that are normally colorless or nearly colorless, but which as they are exposed to high intensity light become colored, the depth of the color being in proportion to the light intensity. If the wearer should suddenly turn his head away from the high intensity light, the glasses desirably lighten with a minimum of lag. There is a need for an automatic antiflash filter that may be incorporated in windows or spectacles to guard against momentarily dangerous fluxes of light. Such an automatic antiflash filter must have a reaction time measured in microseconds and be capable of responding to a flash of light by becoming instantly colored, thereby preventing passage of harmful intensities through the filter.

Any circumstance which results in a change of light intensity of such rapidity that the iris of the eye cannot accommodate rapidly enough to allow perfect vision could be usefully counteracted by such a light-filtering device. Furthermore, mechanical light-sensing devices such as photomultiplier tubes could be similarly protected. Also light-sensitive materials such as light-sensitive dyes in fabrics which are displayed in the sunlight could be so protected. Rapid response in this latter use is not essential.

It has now been discovered that solutions of 4-(2',4'-dinitrobenzyl)-pyridine may be employed to restrict the transmission of visible light, especially high intensity light as typified by flash illuminations. This dinitrobenzyl pyridine compound will be commonly referred to in the following discussion as the gamma-DBP or γ-DBP compound. The γ-DBP compound which in its crystalline form is unaffected color-wise by light has unexpectedly been found to be in its solution form capable of turning blue upon exposure to light. Upon removal of the light, the blue γ-DBP solution rapidly returns to its colorless form. Materials possessing this property are known as phototropic compositions. The intensity of the blue color formed on exposure of the solutions to light is dependent on wave length and light quantity.

The method of the invention for reducing light intensity involves the use of a solution of 4-(2',4'-dinitrobenzyl)-pyridine to absorb visible light rays upon exposure to visible light and near ultraviolet. The γ-DBP compound is dissolved in the solution in an amount effective to cause a visible darkening of the solution upon exposure to visible light. In its preferred embodiment, the solution utilized is a solid; for example, the γ-DBP compound may be dispersed in a synthetic resin or plastic. The γ-DBP compound may be used in amounts up to saturation, but is normally present in the solution in the amount of 0.1% to 10% on a weight basis depending upon the requirements of the particular use. The rapidity, that is, the speed with which many of the γ-DBP compound solutions adjust with variation in light intensity, has been found to be dependent upon the basicity of the solution. The rate of color fading, and as a result the color intensity, can be varied by adjusting basicity. The adjustment of basicity is most desirable in those γ-DBP solutions where the back reaction tends to swamp the forward reaction to the blue form. A basicity equivalent to a pH of 7.5 to 8.5 has been found to be optimum although benefits may be generally derived in solutions having basicity equivalent to pH as high as 9.0. It will be appreciated that the forward reaction driving the γ-DBP compound to its colored form occurs simultaneously with the back reaction urging the compound to its colorless form.

The γ-DBP compound solution in the absence of light is colorless. Upon absorption of light in the near ultraviolet range of 2900–3400 A., the compound in solution undergoes a tautomeric shift to a new structure which is accompanied by an increase in transmission in the ultraviolet, but with a significant decrease in transmission in the visible, particularly in the range of 5400 A.–5800 A. with the peak being at 5600 A.

A light intensity regulating lens for spectacle or goggle use should absorb the visible range in the spectrum proportionately to the ambient light, i.e. with an increase in the intensity of the ambient light, there should be a corresponding increase in absorption as evidenced by further darkening of the lens. The γ-DBP compound of the invention may be utilized either in a liquid cell or dispersed in a clear plastic when supported in the frame of a light intensity regulating device. In the liquid cell there is provided a light path between clear plastic or glass walls at opposite ends of the cell.

In some applications, e.g., in an antiflash goggle, the construction preferably takes the form of a laminated sandwich having several components. The laminate structure need not be used in other applications, e.g., ordinary sunglasses where the light intensity encountered is not excessive. The other layer of the sandwich, i.e., the first layer which the incoming light rays encounter, is an optically clear material which may be either flat or lens shaped capable of transmitting near ultraviolet and visible rays. The material should be abrasive-resistant and may be either glass or a suitable clear plastic such as polymethyl methacrylate, cellulose acetate or other cellulose derivative, polystyrene and polyester plastics. The next layer of the sandwich structure contains the γ-DBP compound in solution. This may be either a solid layer formed of a clear plastic material with the phototropic compound dissolved therein or it may take the form of a liquid solution of the γ-DBP compound contained in a liquid cell. The solid plastic approach is the preferred. The plastic employed is preferably a material such as polyvinyl butyral, polyvinyl alcohol, cellulose acetate, cellulose acetate-butyrate, polymethyl methacrylate, all of which are susceptible of being laminated with the other layers of the sandwich structure to provide good adhesive and optical contact. The innermost layer of the laminated sandwich structure is characterized by good visual transmission and the ability to absorb ultraviolet and infrared rays. Again the material should be rigid, scratch or abrasive resistant and may take the form of a clear plano or corrective type lens for optical defect. There is commercially available an infrared absorbing glass which transmits upwards of 75% of the sun's total light but less than 40% of the total solar heat. A coating of an ultraviolet absorbing material, for example, phenyl salicylate dissolved in a compatible cellulose derivative or polystyrene, may be applied to one surface of the infrared absorbing glass. As an alternative, the innermost layer could be formed of a clear plastic, such as polymethyl methacrylate, cellulose acetate or other cellulose derivative which contains an ultraviolet absorber along with an infrared absorbing material. A suitable ultraviolet absorber is cinnamaldazine. Various copper compounds may be used as infrared absorbing materials.

The outer layer of the sandwich structure must permit transmission of the necessary activating ultraviolet, along with visible light to the gamma pyridine material. For this reason near ultraviolet absorbing compounds should not be incorporated in the outer layer. It is possible to incorporate infrared absorbing material within the outer layer or within the inner layer containing the phototropic material.

Another possible structure employs an interference filter which is used as the innermost layer of the sandwich structure. Interference filters are well known and may be constructed to stop infrared and ultraviolet, passing only desired visible light.

Several techniques have been used to disperse the phototropic material in the synthetic resin plastic. In one approach solid plastic is exposed to a solution of the gamma pyridine compound. The plastic imbibes the solution. The imbibing technique is usually the least satisfactory. It is more desirable to prepare a liquid solution of the plastic and a liquid solution of the gamma pyridine compound, mix the two solutions, and permit the solvents which have been selected because of their suitable vapor pressures to evaporate, leaving a solid plastic with the phototropic compound dispersed therein.

The amount of visible light that can be absorbed is directly related to the total amount of the phototropic material present in the solution. Hence if a saturated solution of a given thickness fails to provide the desired reduction in light intensity, the light absorbing capacity of the device is altered by increasing the depth of the solution, liquid cell or a plastic, to provide the desired protection.

It has been found that tertiary butyl alcohol and ethanol are two of the more desirable liquid solvents for many uses. Five to 50% absolute ethyl alcohol may be added to the tertiary butyl alcohol in order to lower its melting point without appreciably affecting its phototropic properties. A desirable solvent may be defined as one in which there is a favorable balance of the simultaneously occurring forward (color forming) reaction and the reverse or bleaching reaction for the purpose intended. The decay rate of the tertiary butyl alcohol solution has at room temperature a half time in the order of about 20 seconds; that is, 20 seconds after removal of the light source, one half of the blue tautomer structure has disappeared. Ethanol, on the other hand, when used as a solvent for the phototropic material has a decay rate with a half time in the order of 2.2 seconds at room temperature. For this reason the ethanol solution does not give as an intense blue color in an environment say of sunlight as does the tertiary butyl alcohol solution. Ethanol is more desirably used as a solvent for the phototropic material in a goggle design intended for protection of the eyes against a momentarily dangerous flux of light (greater than sunlight) having an intensity say greater than $10^{17}$ or $10^{20}$ photons per square centimeter per second at the site of the solution. This property of rapid bleaching of the ethanol solution is a general characteristic of some of the other γ-DBP solvents. However, adjustment of basicity of many of these solvents, usually to the range equivalent to a pH of 7.5 to 8.5, alters the solution with the result that the return to the colorless form is somewhat retarded.

The γ-DBP compound is soluble in various ones of the common polar organic solvents including the short chain alcohols, ketones and ethers. The ethers include diethyl ether and dipropyl ether. Alcohols that may be employed include for example, methanol, ethanol, propanol, isopropyl alcohol and various ones of the isomerric butyl alcohols including n-butyl, isobutyl and tertiary butyl alcohol. The useable ketones include acetone, ethylmethyl ketone and diethyl ketone. The reverse reaction for some of these solvents may be objectionably fast for some uses. The γ-DBP compound of the invention uniformly exhibits in all of its solutions, either solid or liquid, a very rapid reverse reaction which is a very desirable feature for commercial applications.

Crystals of solid 4-(2',4'-dinitrobenzyl)-pyridine have shown no color change when exposed to direct sunlight at room and subzero temperatures or when exposed to light flashes of high intensity at varying temperatures down to −80° C.

The following examples are not intended to be limiting, but are presented in order to demonstrate the wide temperature range over which various solutions of the γ-DBP compound may be used.

*Example I*

The work of this example shows the effectiveness of the γ-DBP compound at low temperatures, temperatures close to the range that may be expected to be encountered in an aircraft window at high altitudes. Solutions of the gamma pyridine compound in varying concentrations including 5 weight percent were prepared of the following solvents: ethanol (95% alcohol), acetone, ether, and tertiary butyl alcohol. The various solutions were exposed to an Osram high pressure mercury lamp. The acetone and 95% ethanol solutions were first exposed to the lamp at −80° C. Both of the solutions rapidly formed a dark purple color. The ether and tertiary butyl alcohol solutions were then exposed to the lamp at −80° C., with each solution instantly taking on a deep intense color, in the instance of the tertiary butyl alcohol the color being a very dark purple and in the case of the ether, a magenta color. At this very low temperature the bleaching action proved to be considerably slower than at higher temperatures.

*Example II*

The phototropic material of the invention was dissolved in tertiary butyl alcohol in the several concentrations including 5 weight percent. At room temperature the solutions took on a purple color on exposure to the Osram high pressure mercury lamp. The bleaching action upon removal of the light was much more rapid than at the low temperatures of Example I.

*Example III*

A solution of the γ-DBP compound was dissolved in tertiary butyl alcohol in the concentration of 5 weight percent. The solution at room temperature was exposed to high intensity, short term flashes of light having an intensity of about $10^{17}$ photons per square centimeter per second. The solution was observed to change to a blue color with each flash and to return to its colorless form. A flash photolysis apparatus capable of measuring the decay rate of the colored form of the phototropic material disclosed that half time decay was in about 20 seconds. The tertiary butyl alcohol solution in the work of this example was held in a liquid cell having a light path length of 4 cm. The cell was provided with an interference filter that removed a proportionately large share of the infrared and ultraviolet of the short term flashes. The work of this example demonstrates the usefulness of tertiary butyl alcohol solutions where there is required a rapid cutoff with a reasonably fast return to the open condition; that is, to the colorless state.

*Example IV*

A 5% solution of γ-DBP was prepared in a solution of 90% tertiary butyl alcohol–10% absolute alcohol. This solution may be cooled without crystallization to 0° C.

while contained in a liquid cell between two sheets of polymethyl methacrylate. On separate exposures at room temperature to sunlight and to short bursts of light from high intensity flash apparatus, the cell turned blue.

Various clear synthetic resin or plastic materials with the phototropic material of the invention dissolved therein have been demonstrated to have the ability to absorb visible light rays, showing their usefulness for reducing light intensity. Among the available clear plastics are the cellulose derivatives including cellulose acetate and acetate butyrate, the acrylics including polymethyl methacrylate, the vinyl polymers including polyvinyl alcohol, and the polyester resins. The solid solution form of the phototropic material is generally preferred to the liquid solution because, among other reasons, a solid material may be more conveniently incorporated into a device. The following examples are presented to demonstrate a few of the plastics in which the $\gamma$-DBP compound may be used. The plastic films were cast by dissolving the plastic and the phototropic material separately in compatible solvents, followed by mixing of the two solutions. The plastic solidified upon evaporation of the solvents, providing a solid solution of the phototropic material. The solvent used in most instances for both the plastic and the phototropic material is acetone; however, other low boiling, readily vaporizing compatible solvents may be utilized.

*Example V*

The plastic cellulose acetate butyrate and the $\gamma$-DBP compound were separately dissolved in acetone and the two solutions mixed. The resulting solution of cellulose plastic and the phototropic material was cast in a thin film and the solvent permitted to evaporate. The plastic film contained the phototropic material in the amount of 16.4 weight percent. The cellulose film took on a blue color at room temperature in sunlight. The plastic films reversibly colored and bleached with changes in light intensity. The plastic film containing the $\gamma$-DBP pyridine compound of this invention when used as a lens provided comfortable viewing for an observer looking at a distant object.

*Example VI*

A solution of cellulose acetate in acetone was mixed with an acetone solution of the phototropic material and a film cast from the mixture. Upon evaporation of the acetone solvent, the phototropic material was present in the plastic film in an amount of 16.4 weight percent. The film in sunlight at room temperature took on a blue color. The coloring and bleaching of the film were found to respond to changes in light intensity.

*Example VII*

A film of polymethyl methacrylate containing a solution of the phototropic material in the amount of 10 weight percent was prepared using acetone as a solvent. The resulting film showed a reversible blue color at room temperature in sunlight. The polymethyl methacrylate film again provided comfortable viewing for an observer looking at a distant object and proved to be responsive to changes in light intensity.

*Example VIII*

A film of polystyrene containing a solution of the phototropic material in the amount of 10 weight percent was prepared with acetone as the solvent. The film took on a blue color at both room temperature and subzero temperatures. In this example, as in the preceding, the film provided comfortable viewing in sunlight for an observer looking at a distant object.

*Example IX*

The work of this example demonstrates the effect of basic environments on $\gamma$-DBP compounds. Adjustment of the basicity of an ethanol solution of the phototropic compound (5 weight percent) to varying pH equivalents was shown to shorten the half time decay rate, the degree of change increasing with increase in basicity. The shortening of the decay rate was apparent to the naked eye.

Although exemplary embodiments of the invention have been disclosed herein for purposes of illustration, it will be understood that various changes, modifications and substitutions may be incorporated in such embodiments without departing from the spirit of the invention as defined by the claims which follow.

We claim:
1. A composition of matter consisting essentially of a solid solution of 4-(2′, 4′-dinitrobenzyl)-pyridine and synthetic resin, said pyridine compound being dissolved in the resin in an amount effective to cause a darkening of the solid solution upon exposure to visible light and near ultraviolet, said pyridine compound being present in the resin in an amount within the range of 0.1 weight percent to saturated solution.

2. A method for reducing light intensity which comprises providing a solid solution of 4-(2′, 4′-dinitrobenzyl)-pyridine and a synthetic resin, said pyridine compound being dissolved in the synthetic resin in an amount effective to cause a darkening of the solid solution upon exposure to visible light and near ultra violet radiation and in an amount within the range of 0.1 weight percent to saturated solution, and exposing said solid solution to a radiation source and causing a darkening of the solution, said solution being further characterized by its ability to rapidly return to a less dark form with a reduction in the intensity of said radiation.

3. A method in accordance with claim 2 wherein the visible light has an intensity greater than sunlight.

4. A method in accordance with claim 2 wherein the solution has a basicity equivalent to a pH in the range of 7.0 to 9.0.

References Cited by the Examiner

UNITED STATES PATENTS

| 1,845,835 | 2/1932 | Frankenburger et al. |
| 2,895,892 | 7/1959 | Chalkley. |
| 2,921,407 | 1/1960 | Wagner et al. |

FOREIGN PATENTS

| 1,235,251 | 5/1960 | France. |

OTHER REFERENCES

Journal of the American Chemical Society, vol. 78, May 20, 1956, Hirschberg, pp. 2304–2312.

Transactions of the Faraday Society, vol. 54, December 1958, Clark et al., pp. 1790–1796.

Transactions of the Faraday Society, vol. 56, January 1960, Hardwick et al., pp. 44–50.

LEON D. ROSDOL, *Primary Examiner.*

E. G. ANDERSON, ALBERT T. MEYERS, JULIUS GREENWALD, *Examiners.*

D. H. RUBIN, R. D. LOVERING, *Assistant Examiners.*